United States Patent
Liardet et al.

(10) Patent No.: US 8,190,909 B2
(45) Date of Patent: May 29, 2012

(54) PROTECTION OF THE EXECUTION OF A PROGRAM

(75) Inventors: Pierre-Yvan Liardet, Peynier (FR); Yannick Teglia, Marseilles (FR)

(73) Assignee: STMicroelectronics S.A., Montrouge (FR)

(*) Notice: Subject to any disclaimer, the term of this patent is extended or adjusted under 35 U.S.C. 154(b) by 656 days.

(21) Appl. No.: 12/100,652

(22) Filed: Apr. 10, 2008

(65) Prior Publication Data

US 2008/0256301 A1    Oct. 16, 2008

(30) Foreign Application Priority Data

Apr. 12, 2007  (FR) ..................... 07 54405

(51) Int. Cl.
| G06F 11/30 | (2006.01) |
| G06F 12/14 | (2006.01) |
| G06F 13/00 | (2006.01) |
| G06F 13/28 | (2006.01) |
| G06F 9/30  | (2006.01) |
| G06F 9/40  | (2006.01) |
| G06F 7/38  | (2006.01) |
| G06F 9/00  | (2006.01) |
| G06F 9/44  | (2006.01) |

(52) U.S. Cl. ........ 713/187; 713/189; 712/208; 712/220; 711/159

(58) Field of Classification Search ............ 713/187, 713/189–194; 711/159; 712/208, 220
See application file for complete search history.

(56) References Cited

U.S. PATENT DOCUMENTS

| 7,055,146 | B1* | 5/2006 | Durr et al. ..................... 717/162 |
| 7,162,735 | B2* | 1/2007 | Safa ................................. 726/6 |
| 7,168,065 | B1  | 1/2007 | Naccache et al. |
| 7,287,166 | B1* | 10/2007 | Chang et al. .................. 713/187 |
| 7,346,762 | B2* | 3/2008 | Misra et al. ................... 712/226 |
| 7,353,343 | B2* | 4/2008 | Yang .............................. 711/152 |
| 7,593,258 | B2* | 9/2009 | Liardet et al. ............ 365/185.02 |
| 7,941,639 | B2* | 5/2011 | Teglia et al. .................. 712/207 |
| 2002/0038428 | A1* | 3/2002 | Safa .............................. 713/187 |
| 2003/0120938 | A1* | 6/2003 | Mullor ......................... 713/190 |
| 2005/0069131 | A1* | 3/2005 | de Jong ....................... 380/239 |
| 2005/0069138 | A1* | 3/2005 | de Jong ....................... 380/278 |
| 2005/0071652 | A1* | 3/2005 | de Jong ....................... 713/189 |
| 2005/0071653 | A1* | 3/2005 | de Jong ....................... 713/189 |
| 2005/0071655 | A1* | 3/2005 | de Jong ....................... 713/190 |
| 2005/0071664 | A1* | 3/2005 | de Jong ....................... 713/200 |
| 2005/0251708 | A1* | 11/2005 | Bancel et al. .................. 714/49 |
| 2005/0257033 | A1* | 11/2005 | Elias et al. .................... 712/236 |

(Continued)

OTHER PUBLICATIONS

French Search Report from corresponding French Application No. 0754405, filed Apr. 12, 2007, Search Report dated Nov. 7, 2007.

*Primary Examiner* — Christian Laforgia
(74) *Attorney, Agent, or Firm* — Wolf, Greenfield & Sacks, P.C.

(57) ABSTRACT

A method for controlling the execution of at least one program in an electronic circuit and a processor for executing a program, in which at least one volatile memory area of the circuit is, prior to the execution of the program to be controlled, filled with first instructions resulting in an exception processing; the program contains instructions for replacing all or part of the first instructions with second valid instructions; and the area is called for execution of all or part of the instruction that it contains at the end of the execution of the instruction program.

24 Claims, 2 Drawing Sheets

U.S. PATENT DOCUMENTS

2006/0277539 A1* 12/2006 Amarasinghe et al. ....... 717/168
2007/0150952 A1* 6/2007 Teglia et al. ................. 726/22
2007/0159882 A1* 7/2007 Liardet et al. ............ 365/185.04
2007/0168650 A1* 7/2007 Misra et al. .................. 712/220
2007/0180319 A1* 8/2007 Teglia et al. ................. 714/24
2008/0155232 A1* 6/2008 Misra et al. .................. 712/208

* cited by examiner

PROTECTION OF THE EXECUTION OF A PROGRAM

BACKGROUND OF THE INVENTION

1. Field of the Invention

The present invention generally relates to electronic circuits and, more specifically, to the control of the execution of a program by a microprocessor.

2. Discussion of the Related Art

In most programs or algorithms executed by a microprocessor, conditional jumps, that is, steps during which the program selects the next instruction to be executed from among two different instructions can be found. Such jumps are generally decided according to the state of a flag. According to this flag, the program execution carries on with one instruction or another. The conditional jump to a different address in the program occurs at this time.

Such an operation is satisfactory in many applications. However, in programs manipulating secret quantities or more generally implementing algorithms for which it is not desired for an unauthorized user to be able to modify the program sequencing, such jumps are particularly critical points.

In particular, a common type of attack to induce secret quantities from the execution of an algorithm or to fraudulently pass tests is known as an injection attack and comprises forcing a program trap by introducing a disturbance (for example, on the processor power supply) at strategic positions in its execution. Such fault injections then enable discovering the manipulated secret quantities. For example, in simplified fashion, if a conditional jump verifies the exactness of a key against a prerecorded key, the conditional jump to the authorized instructions must not occur if the right key is not introduced into a corresponding program variable. By presenting a wrong key and by causing disturbances on the program execution (fault injection), a wrong (illicit) conditional jump resulting in the acceptance of the wrong key will statistically occur. Now, it is enough for the jump to be allowed once to enable a hacker to exploit the processings executed by the algorithm and thus hack the program.

A known technique for protecting a program against fault injections comprises calculating signatures of two executions of a same program to compare these signatures with a prerecorded signature or with respect to each other. This requires two executions of the program, and thus either two hardware cells, or twice as much time. Further, the integrated circuit executing the program needs to have functions enabling to calculate the corresponding signatures.

US patent application No 2005/0257033 (04-RO-030, B6511) describes a solution according to which a jump address is calculated according to a result over several bits indicative of the fact that a desired condition is fulfilled, program blocking instructions being placed at the respective addresses to which the jump leads in the case where the expected condition is not fulfilled. The selection of the branching addresses needs to be performed on creation of the program contained in the non-volatile memory. The areas containing the blocking instructions are thus dedicated to a specific test.

SUMMARY OF THE INVENTION

The present invention aims at overcoming all or part of the disadvantages of known solutions for protecting the execution sequencing of a program.

An object is a versatile solution, usable by different programs.

Another object is a solution taking up little non-volatile memory space.

To achieve all or part of these objects as well as others, an embodiment of the present invention provides a method for controlling the execution of at least one program in an electronic circuit, in which:

at least one area of volatile memory of the circuit is, prior to the execution of the program to be controlled, filled with first instructions resulting in an exception processing;

the program contains instructions for replacing all or part of the first instructions with second valid instructions; and said area is called for execution of all or part of the instructions that it contains at the end of the execution of the instruction program.

According to an embodiment, a last second instruction of said area is, in case of a normal program run, an instruction for returning into it.

According to an embodiment, the replacing of a first instruction with a second one is performed at different points of the calling program.

According to an embodiment, the replacing of the first instructions with the second ones is performed just before the call of said area.

According to an embodiment, each first instruction results in a locking of the circuit.

According to an embodiment, said volatile memory area is reset with first instructions on each new execution of a program, the execution of which is desired to be controlled.

According to an embodiment, the second instructions result in a sequential successive execution of the instructions of said area.

According to an embodiment, the second instructions are jumps into said area to an instruction for returning into the program.

The present invention also provides an integrated program execution processor comprising at least one non-volatile memory for storing a program, the execution of which is desired to be controlled, and at least one volatile memory, in which an area of the volatile memory is reserved for an execution control.

The foregoing and other objects, features, and advantages of the present invention will be discussed in detail in the following non-limiting description of specific embodiments in connection with the accompanying drawings.

DETAILED DESCRIPTION

Figure 1:
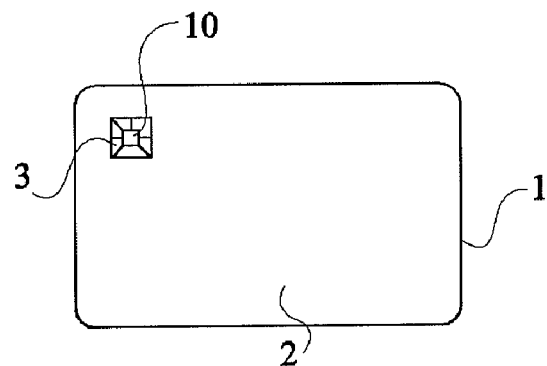
FIG. 1 shows a smart card of the type to which the present invention applies as an example.

The same elements have been designated with the same reference numerals in the different drawings.

For clarity, only those steps and elements which are useful to the understanding of the present invention have been shown and will be described. In particular, the main functions of the programs having a protected execution, have not been detailed, the present invention being compatible with any usual program.

FIG. 1 very schematically shows a smart card 1 of the type to which the present invention applies as an example. Such a card is, for example, formed of a support 2 made of plastic matter in or on which is placed an electronic circuit chip 10 capable of communicating with the outside by means of contacts 3 or by means of contactless transceiver elements (not shown). Circuit 10 of the card contains a processing unit capable of executing programs stored in memories also contained in circuit 10 or in other circuits supported by the card.

Figure 2:
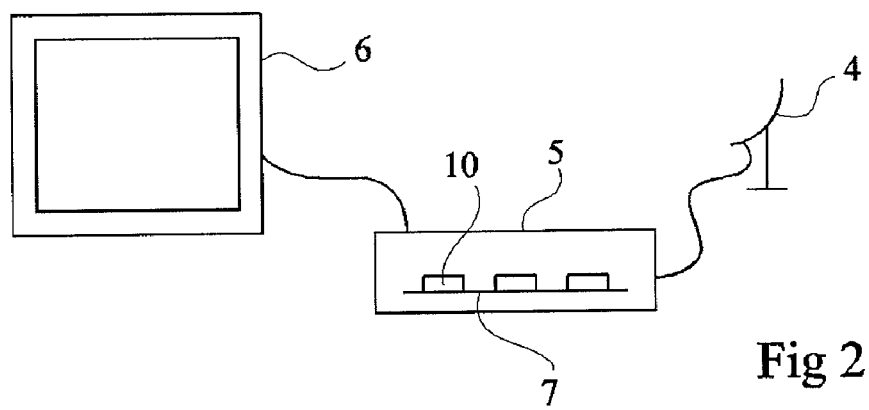
FIG. 2 very schematically shows a receiver of broadcast signals of the type to which the present invention applies as an example.

FIG. 2 shows another example of application of the present invention to controlled-access broadcasting systems. In this example, an antenna 4 receives signals from a satellite (not shown) and transmits them to a decoder 5 for display on a television 6. Decoder 5 comprises one or several electronic boards 7 provided with one or several circuits 10 for processing the received digital data. This processing comprises a decoding by means of one or several secret quantities (cryptographic key) owned by decoder 5. The keys are contained in memories associated with electronic circuit 10 or on an external element, for example, a smart card introduced into decoder 5. Decoder 5 here again executes programs, the sequencing of which may be desired to be checked.

Figure 3:
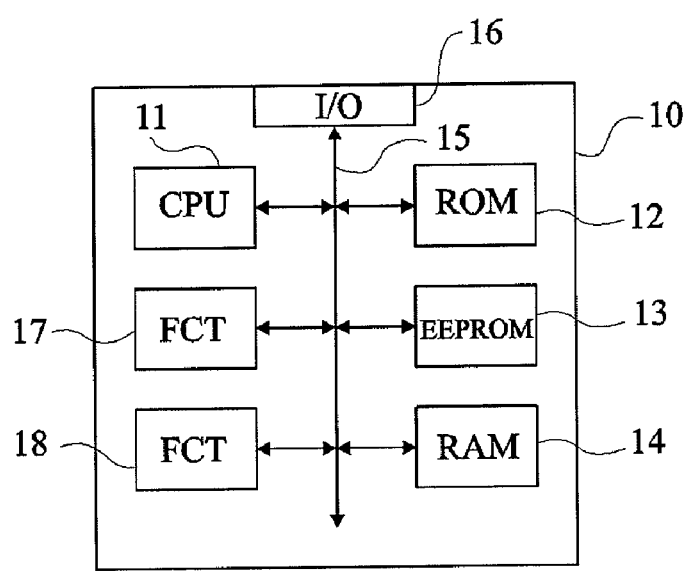
FIG. 3 is a block diagram of an example of an electronic circuit architecture of the type to which the present invention applies as an example.

FIG. 3 is a block diagram of an embodiment of an electronic circuit 10. This circuit comprises a central processing unit 11 (CPU) capable of executing programs contained in one or several memories. In this example, circuit 10 comprises a non-reprogrammable non-volatile memory 12 (ROM), a reprogrammable non-volatile memory 13 (EEPROM), and a RAM 14. One or several data, address, and control buses 15 are used as a support for the communication between the different components of circuit 10 and with an input/output interface 16 (I/O) for communication with or without contact with the outside. Most often, circuit 10 comprises other functions (blocks 17 and 18, FCT) depending on the application. These are, for example, dedicated cryptographic calculation cells for implementing ciphering and deciphering algorithms.

Figure 4:
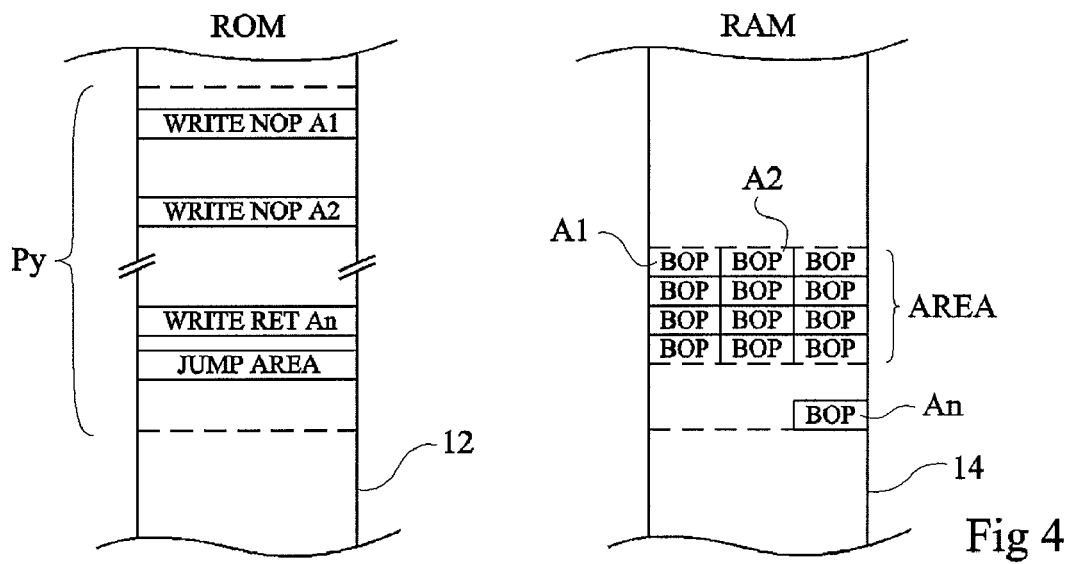
FIG. 4 illustrates an embodiment with respective non-volatile and volatile memory contents.

FIG. 4 illustrates an example of the structure of a program Pg in non-volatile (for example, non-rewritable) ROM 12, and of a volatile memory area 14 according to an embodiment.

Figure 5:
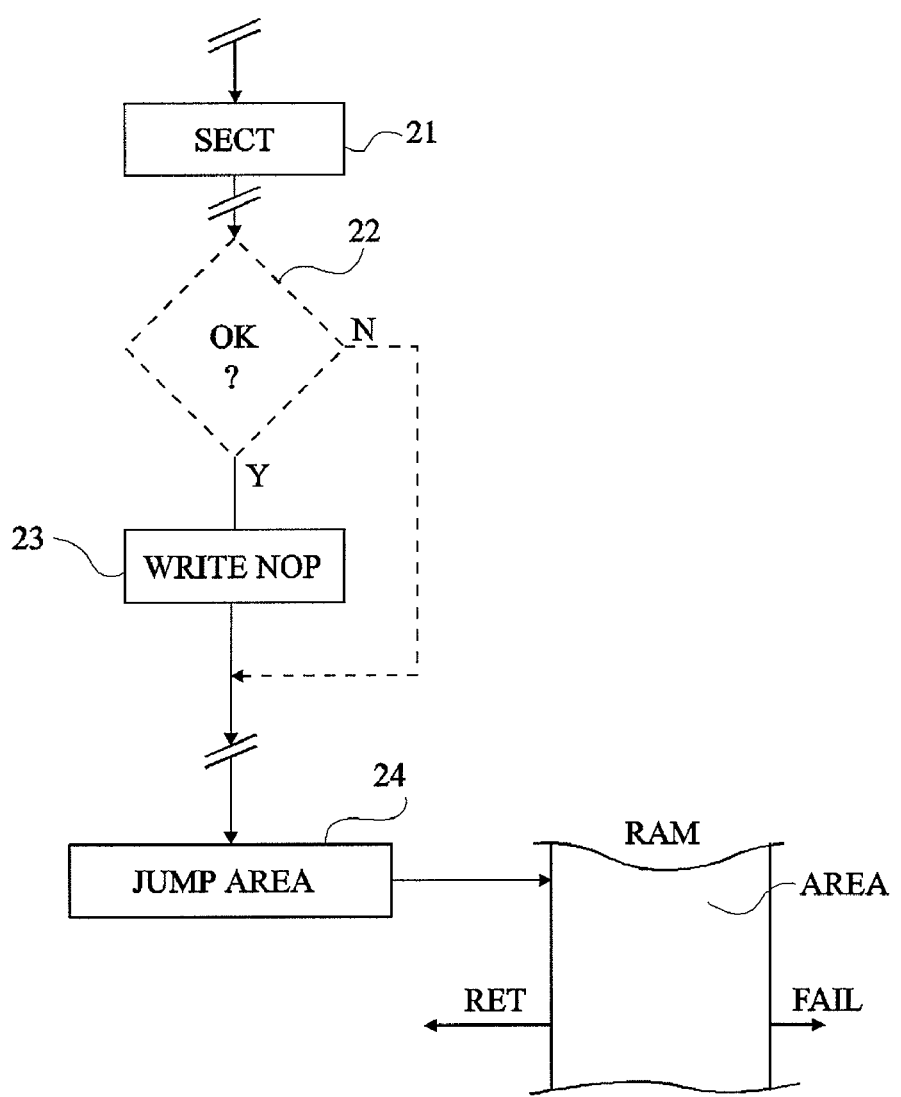
FIG. 5 is a simplified flowchart of an embodiment.

FIG. 5 is a simplified flowchart illustrating an embodiment of the method for controlling the execution of program Pg.

Before the execution of a program Pg having its execution monitored by this embodiment, a predefined area AREA in memory 14 (for example, its last lines) is filled with a succession of opcodes BOP (Bad Opcode), each triggering an exception behavior, for example, a circuit locking, a deleting of all memories, etc.

The filling of area AREA with instructions BOP may, according to the application, be performed on starting of the electronic circuit, before the execution of a program, the execution of which is desired to be controlled, before the execution of a specific routine calling security functions, etc.

Program Pg is, on design thereof, provided with instructions WRITE NOP for writing a correct opcode at addresses A1, A2, etc. of area AREA. Instructions NOP thus replace, if program Pg is properly executed, the bad instructions BOP with correct instructions (Normal Opcode) which do not result in an exception processing.

Instructions WRITE NOP do not interfere with the progress of program Pg, since these instructions do not modify the content of the variables processed by program Pg.

According to an example, instructions WRITE NOP (block 23, FIG. 5) are placed at different points of program Pg (for example, in or at the end of sections 21 (SECT) considered as critical or through which it needs to be passed).

According to another example illustrated in dotted lines in FIG. 5, an instruction WRITE NOP is, in program Pg, preceded by a test (block 22, OK?) on an execution phase of program Pg. Test 22 is, for example, a test on the result of another function for detecting a possible disturbance (for example, a signature calculation). In the case where it is not respected, instruction 23 is skipped.

At least one of instructions WRITE NOP writes, in area AREA (for example, at address An), an instruction RET for returning into program Pg. Write instruction WRITE RET is, for example, the last control instruction of the calling program.

The selection of the opcodes (NOP) replacing exception processing instructions BOP is performed so that, on calling of the sub-program of area AREA, return instruction RET is reached if all instructions BOP have been replaced.

For example, these may be jumps from an address to another of area AREA to reach the return instruction address. According to another example, the instructions of area AREA are successively replaced during the progress of program Pg with instructions (NEXT) for proceeding to the next instruction until an address containing return instruction RET is reached. Several lines of program Pg may result in the replacing of a same instruction of area AREA if it is considered that the passing through at least one of these lines is enough to validate the correct execution. Similarly, the passing through a line of program Pg may result in the replacing of several instructions of area AREA.

The complexity of the sub-program of area AREA (sequential execution, nested jumps, etc.) depends on the design of the program to be monitored. This sub-program may perform other cryptographic calculations.

At the end of the program or at the end of the execution of a critical area, or when the program execution is desired to be validated, said program contains an instruction JUMP AREA for jumping to an address of area AREA of memory 14 (block 24). This jump results in the execution of all or part of the opcodes of area AREA (according to the routine represented by these codes on writing thereof) until a return instruction RET in calling program Pg to carry on its execution.

In case of an incorrect execution of the main program, at least one of exception opcodes BOP will not have been replaced and the execution of the control subprogram will thus result in an exception processing (FAIL).

An advantage is that the same RAM area may be used for the different execution controls performed on different circuit programs. The only precaution is to avoid for this area to be, in normal operation, crushed during the program execution between the initialization of the area with the exception opcodes and the end of the program, the execution of which is desired to be controlled.

Another advantage is that the construction of verification sub-program 24 at the program end is dynamic. It is thus performed along the program execution. It is thus difficult to hack.

Another advantage is that the RAM area needs no predefined structure. The control function can thus organize its path as desired by the programmer in area AREA. For example, different nested programs may share a same area AREA provided that a correct execution of each of them results in the correct replacing of instructions BOP and in a return instruction RET. According to another example, different portions of area AREA (and thus different areas AREA) are assigned to different programs to be controlled. Here again, the selection is up to the designer of the main program who selects the write addresses of instructions NOP it his will.

Another advantage is that the main program builds no jump address, which improves security.

Another advantage is that the use of a volatile memory area AREA already brings a first protection due to its very nature. Indeed, in case of a circuit reset, all instructions NOP are lost and, even if they do not result in an exception processing, they do not enable returning to the main program. It may be provided for the processing unit to interpret any code following a reset (for example, 0000) as an exception processing.

Another advantage is that, by default, the entire area AREA contains bad opcodes, and thus a jump in this area (for example, following a trap) before modification of this area will necessarily result in an exception processing.

According to an alternative embodiment, the updating of the opcodes of area AREA is not performed along the execution of the program to be controlled but in grouped fashion before execution control jump 24. In this case, volatile memory variables (registers or other memory areas) are used to store the successive instructions NOP before writing into RAM area AREA.

Specific embodiments have been described. Various alterations and modifications will occur to those skilled in the art. In particular, the selection of the opcodes to be included in the RAM verification area depends on the application and, for example, on the execution time which is desired to be given to this control function. Further, although the present invention has been described in relation with a program stored in a non-rewritable non-volatile memory (ROM), the program having its execution controlled may also be stored in a rewritable non-volatile memory (EEPROM).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for controlling the execution of at least one program in an electronic circuit, the method comprising:
    filling at least one area of volatile memory of the electronic circuit with first instructions that, when executed, would result in an exception processing;
    prior to executing a jump instruction of the at least one program to jump execution to the at least one area and while executing the at least one program, replacing all or part of the first instructions in the at least one area with second valid instructions, the replacing comprising overwriting a first instruction with a second instruction; and
    following the replacing, executing the jump instruction to jump execution to the at least one area and executing instructions stored in the at least one area.

2. The method of claim 1, wherein executing the second valid instructions comprises, in case of a normal program run, an instruction for returning to executing instructions of the at least one program not stored in the at least one area.

3. The method of claim 1, further comprising repeating the replacing a portion of the first instructions with the second valid instructions at different points of the at least one program.

4. The method of claim 1, wherein filling the at least one area with first instructions comprises filling the at least one area with first instructions that result in a locking of the electronic circuit.

5. The method of claim 1, further comprising:
    on each new execution of the at least one program, resetting the at least one area of said volatile memory and repeating the act of filling the at least one area with the first instructions.

6. The method of claim 1, wherein executing the second valid instructions comprises performing a sequential successive execution of at least part of the instructions of the at least one area.

7. The method of claim 1, wherein executing the jump instruction comprises executing one or more jumps into the at least one area to one or more addresses at which is stored an instruction.

8. An integrated program execution processor comprising at least one non-volatile memory for storing a program, the execution of which is desired to be controlled, and at least one volatile memory, wherein an area of the volatile memory is reserved for the execution control of claim 1.

9. The method of claim 1, wherein replacing all or part of the first instructions with second valid instructions comprises:
    retrieving from memory at least one instruction, each of the at least one instruction retrieved from memory being an operation to write data to a memory location and specifying the data and the memory location, the memory location being a location in the at least one area of the volatile memory and the data comprising at least one of the second valid instructions, and
    executing the at least one instruction to write the data to the memory location.

10. A method for protecting execution of a program, the program comprising a sequence of instructions, the sequence of instructions comprising a jump instruction to jump execution to a first address, the method comprising:
    filling a first area of a first memory with first instructions that result in exception processing when executed, the first area including the first address;
    prior to execution of the jump instruction, executing at least some of a first portion of the sequence of instructions, the first portion comprising instructions to replace the first instructions in the first area with second instructions, the first portion not including the jump instruction;
    executing the jump instruction to jump execution to the first address; and
    executing at least one instruction stored at the first address.

11. The method of claim 10, wherein executing the first portion of the sequence of instructions comprises:
    determining whether at least one condition is met;
    when the at least one condition is met, executing the instructions to replace the first instructions; and
    when the at least one condition is not met, refraining from executing the instructions to replace the first instructions.

12. The method of claim 11, wherein, when the at least one condition is not met, executing the at least one instruction stored at the first address comprises executing an instruction of the first instructions that results in exception processing when executed, and when the at least one condition is met, executing the at least one instruction stored at the first address comprises executing a second instruction.

13. The method of claim 10, where executing at least some of the first portion of the sequence of instructions comprises conditionally executing the instructions to replace the first instruction in the at least one area with second instructions.

14. The method of claim 10, wherein filling the first area of the first memory comprises filling the first area of a first volatile memory, and
wherein the sequence of instructions is stored in a non-volatile memory and wherein executing at least some of a first portion of the sequence comprises executing instructions stored in the non-volatile memory.

15. The method of claim 14, wherein the non-volatile memory stores the second instructions, and
wherein the instructions to replace the first instructions in the at least one area comprise instructions to copy the second instructions to the first area.

16. The method of claim 10, wherein the sequence of instructions comprises the second instructions.

17. The method of claim 10, wherein executing the instructions to replace the first instructions with the second instructions comprises overwriting the first instructions with the second instructions.

18. An apparatus comprising:
a volatile memory to store instructions in a first area; and
a processing unit programmed to:
fill the first area of the volatile memory with first instructions that, when executed, would cause an exception processing,
execute a sequence of instructions not including the first instructions, the sequence of instructions comprising a jump instruction to jump execution to the first area and instructions to replace the first instructions in the first area with second instructions that would not cause exception processing when executed, wherein the instructions to replace the first instructions are arranged in the sequence of instructions before the jump instruction, and
following execution of the sequence of instructions, execute instructions stored in the first area.

19. The apparatus of claim 18, further comprising:
a nonvolatile memory to store the sequence of instructions and the second instructions.

20. The apparatus of claim 18, wherein the jump instruction is an instruction to jump execution to an address of the first area, and
wherein the processing unit is programmed to execute the sequence of instructions by executing the jump instruction to jump execution to the address.

21. The apparatus of claim 18, wherein the processing unit is programmed to execute the instructions stored in the first area at least in part by executing instructions to:
determining whether at least one condition is met;
when the at least one condition is met, execute the instructions to replace the first instructions; and
when the at least one condition is not met, refrain from executing the instructions to replace the first instructions.

22. The apparatus of claim 21, wherein the processing unit is programmed to:
when the at least one condition is not met, execute the at least one instruction stored at a first address of the first area, wherein executing the at least one instruction comprises executing an instruction of the first instructions that results in exception processing when executed, and
when the at least one condition is met, execute the at least one instruction stored at the first address, wherein executing the at least one instruction comprises executing a second instruction that does not result in exception processing when executed.

23. The apparatus of claim 18, wherein the processing unit is programmed to execute the sequence of instructions at least in part by conditionally executing the instructions to replace the first instruction in the at least one area with second instructions.

24. The apparatus of claim 18, wherein the processing unit is programmed to execute the instructions to replace the first instructions with the second instructions at least in part by overwriting the first instructions with the second instructions.

* * * * *